March 13, 1962   J. O. BILLUPS   3,024,630
CLUTCHES
Filed March 16, 1959
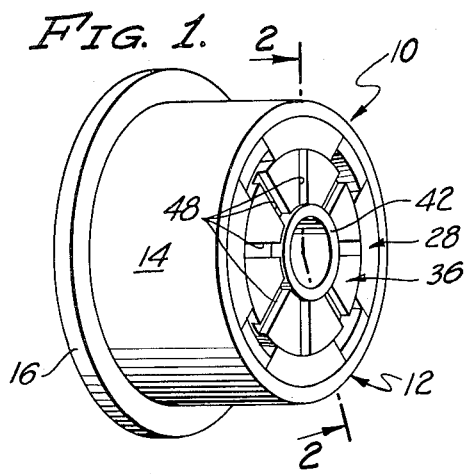
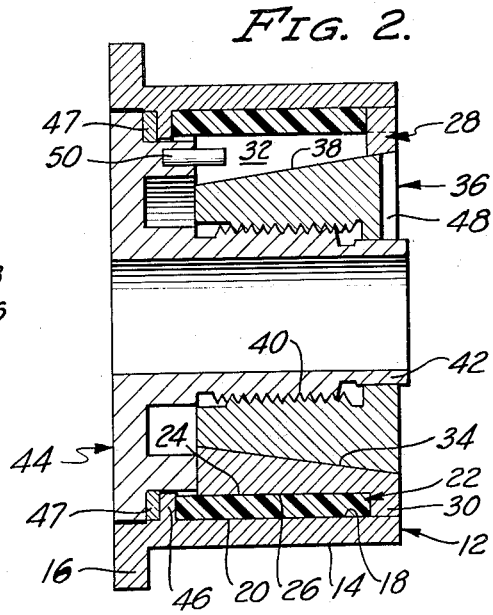
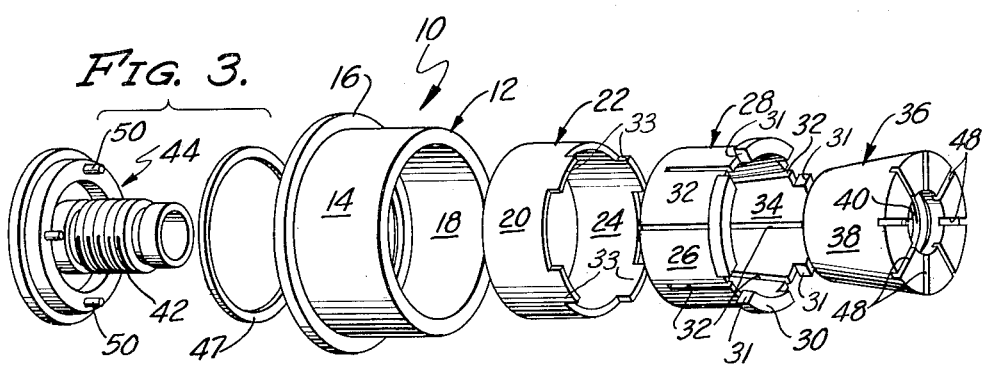
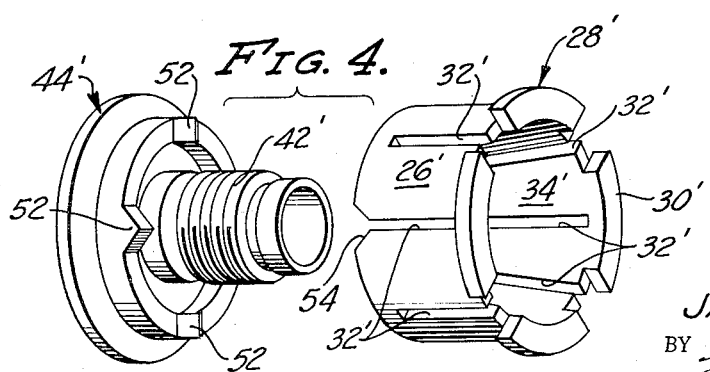
INVENTOR.
JAMES O. BILLUPS
BY
ATTORNEY

United States Patent Office 3,024,630
Patented Mar. 13, 1962

3,024,630
CLUTCHES
James O. Billups, 1601 Oak Ave., Manhattan Beach, Calif.
Filed Mar. 16, 1959, Ser. No. 799,535
14 Claims. (Cl. 64—30)

This invention pertains to new and improved clutches.

The term "clutch" is commonly employed to designate any of a number of different types of devices which are designed so as to connect two rotatably mounted parts in order to control the transmission of rotation from one of these parts to another of these parts. Frequently such clutches are used to control rotation in such a manner that a given predetermined amount of torque has to be exerted upon them in order to transmit rotation between two different members as briefly indicated above.

Clutches are used in this manner for a wide variety of purposes. Frequently they are employed so as to connect a shaft to a rotatable member used to adjust an electrical instrument or the like. They are normally used in this latter type of installation when it is desired to protect an electrical instrument from being actuated to too great an extent, as, for example, when such an instrument would be damaged by having a part of it rotated past the limit of normal rotation.

For a clutch to be effective in this type of use, it must possess a number of qualities. It must be capable of being actuated when a given predetermined amount of torque is applied to it through the two rotatable members to which it is attached. Further, it must work in a "smooth" manner so that once actuated it does not bind until the torque applied to it by the two attached rotatable members is reduced to this predetermined value, so that the clutch serves to transmit rotation from one of these members to the other. Further, the clutch must be capable of consistently allowing slippage between two rotatable members attached to it under predetermined conditions. Preferably such a clutch must be capable of being adjusted so that such conditions may be varied as may be required for use.

A broad object of this invention is to provide new and improved clutches of the general category indicated in the preceding paragraph. A more specific object of this invention is to provide clutches which operate in a "smooth" manner in that they do not serve to cause rotation between two rotatable members attached to them after they have started to allow one of these members to rotate independently of the other until the torque applied is reduced below a predetermined value. Another objective of this invention is to provide clutches of this type which may be easily and conveniently adjusted so as to be capable of being used under a wide variety of conditions.

A still further object of this invention is to provide clutches of the class described which are reliable and which may be manufactured at a comparatively nominal cost. Other objects of this invention are to provide clutches as indicated which eliminate backlash, and which permit rotation in either of two directions.

These and other objects of this invention, as well as many specific advantages of it, will be fully apparent in a detailed consideration of the remainder of this description including the appended claims and the accompanying drawing in which:

FIG. 1 is an isometric view of a clutch of this invention;

FIG. 2 is a cross-sectional view taken at line 2—2 of FIG. 1;

FIG. 3 is an exploded view showing the various parts of this clutch; and

FIG. 4 is an exploded view showing two modified parts which may be used in connection with the parts shown in the preceding figures in creating a modified clutch of this invention.

In all figures of the drawing like numerals are used to designate like parts wherever convenient for purposes of illustration and explanation. It is to be understood that the accompanying drawing is primarily intended so as to clearly illustrate several presently preferred embodiments or forms of this invention. Those skilled in the art to which this invention pertains will realize however that a number of differently appearing clutches falling within the broad scope of this invention as herein explained may be designed or constructed through the use of routine engineering skill.

As an aid to understanding this invention it can be stated in essentially summary form that it concerns clutches, each of which includes a hollow member having an interior surface which is smooth and which has the shape of a surface of revolution. Within such a member there is fitted a sleeve formed of a polymeric material capable of being deformed under pressure; this sleeve has an exterior shape corresponding to the interior shape of the hollow member and fits against the interior of it. Further, with a clutch embodying this invention means are provided within the interior of the sleeve so as to exert pressure on the sleeve itself in order to hold the sleeve against the interior of the hollow member.

As will hereinafter be explained such means may include a plurality of parts, and specifically a ring which is adapted to be expanded against the interior of the sleeve, a plug which is adapted to be forced against the interior of the ring so as to expand it, and a mounting member attached to this plug. The two members indicated in this brief summary are adapted to be attached to two different rotatable parts which are being connected together through the use of a clutch as herein described. For this purpose they may, of course, be formed with various flanges and the like adapted to be used in connecting them to two different rotatable parts.

The invention itself is best more fully explained by referring directly to the accompanying drawing in which there is shown a clutch 10 of this invention. This clutch 10 includes a hollow member 12 formed out of steel or the like so as to have an external surface 14 adapted to be connected to a rotatable part (not shown). If desired, a flange 16 adapted to faciltiate such mounting may be located in the member 12. This member 12 also includes a smooth cylindrical interior surface 18. Preferably the member 12 has the shape of a thin walled cylinder, the wall of which is capable of deflecting or deforming very slightly as the clutch 10 is used so as to aid in eliminating binding and so as to aid in obtaining smooth operation of this clutch.

A correspondingly shaped exterior surface 20 on a sleeve 22 is positioned directly against the surface 18. Preferably this entire sleeve 22 is formed so as to have a cylindrical, tubular shape out of a polymeric material capable of "giving" or deforming slightly under pressure. Particularly favorable results have been achieved by forming the sleeve 22 out of polyamide resins such as a condensation polymer of hexamethylene diamine and adipic acid. Such resinous materials provide a particularly "smooth" action permitting rotation without "binding" between the member 12 and the sleeve 22 when the clutch 10 is used. If desired these results can be improved by incorporating within the sleeve 22 with a small amount of a solid lubricant such as graphite, molybdenum disulfide or the like in accordance with established techniques.

Within this clutch 10 the interior surface 24 of the sleeve 22 is located directly against a cylindrical exterior surface 26 of an expandable ring 28 formed out of metal.

The ring 28 preferably includes a flange 30 located on one end thereof so as to bear against an end of the sleeve 22 in order to help hold this sleeve in position. This flange 30 as shown in FIG. 3 of the drawing is of a discontinuous character and is formed so as to include discontinuities 31 which receive extensions 33 formed in the sleeve 22. These interfitting parts obviously prevent rotation between the sleeve 22 and the ring 28. The ring 28 also includes a plurality of regularly spaced slots 32 extending completely through its wall, these slots leading from each of the ends of this ring to adjacent the other end of the ring. These slots 32 are staggered so that one of the slots leads from one end of the ring 28 and the next adjacent of the slots 32 leads from the other end of the ring 28. This structure permits the ring 28 to be expanded against the sleeve 28 as force is applied to the interior of it.

Such force is applied to a conical interior surface 34 of the ring 28 through the use of a conical plug 36 having a conical exterior surface fitting tightly against the surface 34. The plug 36 has a threaded opening 40 formed therein. This threaded opening is engaged by a threaded shaft 42 extending from a mounting member 44 having the general form of a plate fitting within the end of the member 12 remote from the flange 30. Preferably a small flange 46 formed on the member 16 is located between the mounting member 44 and the sleeve 22. Through this construction the flange 46 aids in holding the mounting member 44 and the sleeve 22 in position within the member 12. If desired a small washer 47 can be located against the flange 46.

In order to facilitate adjustment of the complete clutch 10 so that it will have virtually any desired "breakaway" point allowing slippage between two rotatable parts or members (not shown) attached to the member 12 and the member 44, respectively, it is preferred to locate on the exposed end of the plug 36 a plurality of slots 48 which may be engaged by an appropriate hand tool in the nature of a screw driver. Further, it is preferred to form on the mounting member 44 a plurality of pins capable of fitting into certain of the slots 32 so as to lock the ring 28 with respect to the mounting member 44 in order to prevent the mounting member 44 from rotating as the position of the plug 36 is adjusted with respect to it through the rotation of this plug 36.

If desired, it is possible to use a modified construction for the mounting member 44 and the ring 28 as indicated in FIG. 4 of the drawing. For convenience of explanation all of the parts set forth in this figure of the drawing are designated by the primes of the numerals previously used except those parts which are different as explained in this description.

In the modified structures shown in FIG. 4 the mounting member 44′ is identical with the mounting member 44 except for the fact that the pins 50 are omitted and are replaced by small wedges 52 extending from the mounting member 44′ into correspondingly shaped notches 54 located in the ring 28′ at the ends of the slots 32′ leading from adjacent to the mounting member 44′. The mounting member 44′ and the ring 28′ are, of course, adapted to be used in combination with the other parts of the clutch 10 in the same manner as the members 28 and 44.

The advantage of the construction shown in FIG. 4 lies in the fact that with it there is substantially no "play" or backlash as the clutch using these parts is adjusted so that the amount of force necessary to allow this clutch to operate so as to permit rotation between two rotatable parts (not shown) attached to it is varied.

It will be realized from a consideration of the aforegoing description that the ring 28 employed with the clutch 10 is actually a sleeve because of its configuration, and because of the fact that it extends completely around the plug 36 within the interior of the member 12. If desired, the ring 28 can be formed of the same material as the sleeve 22, and this sleeve 22 may be omitted. When this is the case the exterior surface 26 of such a ring will, of course, bear directly against the internal surface 18 of the member 12 so as to achieve the type of action which is necessary for the operation of the clutch 10. Alternatively it is also possible to coat the exterior of the ring 28 with a material such as is used in creating the sleeve 22 and to omit the sleeve 22 so as to achieve this same action.

Those skilled in the art to which this invention pertains will realize that clutches as herein described are very efficient for the purpose intended and that these clutches may be easily and conveniently constructed at a comparatively nominal expense. The clutches herein described are also very reliable in operation in that they will permit one rotatable part attached to one of these clutches to rotate without transmitting this rotation to another part attached to this clutch only under given, present conditions. Because of the nature of this invention it is to be considered as being limited only by the appended claims forming a part of this disclosure.

I claim:

1. A clutch which includes: a hollow member, said member having a smooth interior surface formed therein, said surface having the shape of a surface of revolution; a sleeve formed of a polyamide polymer positioned within said member, said sleeve having a smooth exterior surface fitting against the interior surface of said member, said exterior surface having the same shape as said interior surface; an expandable ring located within said sleeve so as to bear against the interior thereof; and means for expanding said ring so as to increase the pressure between said ring and said sleeve and so as to expand said sleeve in order to increase the pressure between said sleeve and said member, said means including a tapered member and a mounting member, said tapered member and said mounting member being adjustably attached to one another so that the relative position of said tapered member with respect to said mounting member and said ring is capable of being adjusted.

2. A clutch as defined in claim 1 wherein said sleeve includes a solid lubricant located therein.

3. A clutch as defined in claim 1 wherein said polyamide is a polymer of hexamethylene diamine and adipic acid.

4. A clutch which includes: a hollow member, said member having a smooth cylindrical interior surface; a cylindrical sleeve, the exterior surface of said sleeve fitting against the interior surface of said member, said sleeve being formed of a polymer capable of being deformed under pressure; a ring having a cylindrical exterior surface and a plurality of slots formed therein extending from each end thereof to adjacent to the other end thereof, said ring being a conical interior surface the exterior surface of said ring fitting tightly against the interior surface of said sleeve; a conical plug having a threaded opening extending along the axis thereof positioned within said ring so as to bear against the conical interior surface of said ring; and a mounting member having a threaded shaft extending therefrom, said shaft being threaded in said opening in said plug.

5. A clutch as defined in claim 4 wherein said sleeve is formed of a polyamide polymer.

6. A clutch as defined in claim 5 wherein said polymer is a condensation polymer of hexamethylene diamine and adipic acid.

7. A clutch as defined in claim 4 wherein said polymer contains a solid lubricant.

8. A clutch which comprises: a hollow member, the interior surface of said hollow member being smooth and having a shape of the surface of revolution; an expandable sleeve positioned within said member, said sleeve fitting against the interior of said hollow member and having an external, continuous external surface having a shape corresponding to the interior shape of said hollow member, said surface of said sleeve being formed of an organic polymer, said polymer being located so as to bear against the interior surface of said hollow member; and means fitting against the interior of said sleeve so as to hold the entire exterior of said sleeve against the interior of said member.

9. A clutch as defined in claim 8 wherein said means includes an expandable member having an exterior surface fitting tightly against the interior of said sleeve and having a tapered internal surface and includes a plug having a tapered surface bearing against said tapered surface of said expandable member and including means for adjusting the position of said plug with respect to said expandable member so as to hold said expandable member against said sleeve.

10. A clutch which comprises: a hollow cylindrical member, said member being capable of being flexible, the interior surface of said hollow member being smooth and having the shape of a surface of revolution; a sleeve formed of an organic polymer positioned within said member, said sleeve fitting against the interior of said hollow member and having an external, continuous surface having a shape corresponding to the interior shape of said hollow member; and means fitting against the interior of said sleeve so as to hold the entire exterior of said sleeve against the interior of said member.

11. A clutch as defined in claim 8 wherein said polymer contains a solid lubricant.

12. A clutch which comprises: a hollow cylindrical member, the interior surface of said hollow member being smooth and having the shape of a surface of revolution; a sleeve formed of an organic polymer positioned within said member, said sleeve fitting against the interior of said hollow member and having an external, continuous surface having a shape corresponding to the interior shape of said hollow member; and means fitting within the interior of said sleeve so as to hold the entire exterior of said sleeve against the interior of said member.

13. A clutch which comprises: a hollow member, the interior surface of said hollow member being smooth and having a shape of the surface of revolution; an expandable sleeve positioned within said member, said sleeve fitting against the interior of said hollow member and having an external surface having a shape corresponding to the interior shape of said hollow member, said surface of said sleeve being formed of an organic polymer, said polymer being located so as to bear against the interior surface of said hollow member; and means fitting against the interior of said sleeve so as to hold the entire exterior of said sleeve against the interior of said member; and interfitting means for preventing rotation of said sleeve with respect to said means fitting against the interior of said sleeve formed on said sleeve and on said means fitting against the interior of said sleeve.

14. A clutch which includes: a hollow member, said member having a smooth cylindrical interior surface; an expandable, cylindrical friction sleeve, the exterior surface of said sleeve fitting against the interior surface of said member, said sleeve being capable of being deformed under pressure; a ring having a cylindrical exterior surface and a plurality of slots formed therein extending from each end thereof to adjacent to the other end thereof, said ring having a conical interior surface, the exterior surface of said ring fitting tightly against the interior surface of said sleeve; a conical plug having a threaded opening extending along the axis thereof positioned within said ring so as to bear against the conical interior surface of said ring; and a mounting member having a threaded shaft extending therefrom, said shaft being threaded in said opening in said plug.

References Cited in the file of this patent
UNITED STATES PATENTS

| | | |
|---|---|---|
| 991,630 | Miller | May 9, 1911 |
| 2,564,605 | Martin | Aug. 14, 1951 |
| 2,638,762 | Rayner | May 19, 1953 |
| 2,705,113 | Bonanno | Mar. 29, 1955 |